US010556624B2

(12) United States Patent
Sohmshetty et al.

(10) Patent No.: US 10,556,624 B2
(45) Date of Patent: Feb. 11, 2020

(54) VEHICLE UNDERBODY COMPONENT PROTECTION ASSEMBLY

(71) Applicant: Ford Global Technologies, LLC, Dearborn, MI (US)

(72) Inventors: Raj Sohmshetty, Canton, MI (US); Sridhar Santi Boyina, Canton, MI (US); Rohit Telukunta, Madison Heights, MI (US); Saied Nusier, Canton, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 15/625,204

(22) Filed: Jun. 16, 2017

(65) Prior Publication Data

US 2018/0362090 A1    Dec. 20, 2018

(51) Int. Cl.
*B62D 21/15*     (2006.01)
*B62D 21/05*     (2006.01)
(Continued)

(52) U.S. Cl.
CPC .......... *B62D 21/157* (2013.01); *B60K 15/063* (2013.01); *B60N 2/015* (2013.01);
(Continued)

(58) Field of Classification Search
CPC ...... B62D 21/05; B62D 21/15; B62D 21/157; B62D 29/007; B62D 25/2027;
(Continued)

(56) References Cited

U.S. PATENT DOCUMENTS 6,003,900 A * 12/1999 Hasegawa ............ B60K 15/073
                                                280/781
6,308,987 B1 * 10/2001 Mitake ............. B60K 15/03504
                                                280/834
(Continued)

FOREIGN PATENT DOCUMENTS

WO   WO-2009077066 A1 *  6/2009  ............... B60N 2/01
WO      2016046637 A1     3/2016
(Continued)

OTHER PUBLICATIONS

R. Kolleck, R. Veit, "Tools and Technologies for Hot Forming with Local Adjustment of Part Properties," Materials Science Forum, vols. 638-642, pp. 3919-3924, 2010.

*Primary Examiner* — Joseph M Rocca
*Assistant Examiner* — Maurice L Williams
(74) *Attorney, Agent, or Firm* — Vichit Chea; Brooks Kushman P.C.

(57) ABSTRACT

A vehicle underbody assembly including a pair of rockers, a pair of side rails, a first cross member, a second cross member, and a fuel tank is provided. Each of the pair of side rails is secured to a rearward portion of one of the rockers. The first cross member extends between the side rails and is thermally treated to form a first central hard strength zone between two first soft strength zones. The second cross member is arranged with the pair of side rails and the first cross member to form a rectilinear frame and is thermally treated to form a second central hard strength zone between two second soft strength zones. The fuel tank is secured between the pair of side rails so that the fuel tank is located within a rectilinear frame formed by the pair of side rails and the cross members.

15 Claims, 10 Drawing Sheets

(51) Int. Cl.
*B60K 15/063* (2006.01)
*B60N 2/015* (2006.01)
*B62D 29/00* (2006.01)
*C21D 1/18* (2006.01)
*C21D 1/673* (2006.01)
*C21D 8/02* (2006.01)

(52) U.S. Cl.
CPC .............. *B62D 21/05* (2013.01); *B62D 21/15* (2013.01); *B62D 21/152* (2013.01); *B62D 29/007* (2013.01); *C21D 1/18* (2013.01); *C21D 1/673* (2013.01); *C21D 8/0294* (2013.01); *B60K 2015/0633* (2013.01); *B60K 2015/0638* (2013.01); *C21D 2211/008* (2013.01); *C21D 2221/01* (2013.01)

(58) Field of Classification Search
CPC ...... B62D 25/08; B62D 21/152; B60N 2/015; B60K 15/063; B60K 2015/0633; B60K 2015/0638; C21D 1/18; C21D 1/673; C21D 2221/01; C21D 2221/10; C21D 2211/008
USPC ............. 296/203.01, 203.04, 193.08, 187.12
See application file for complete search history.

(56) References Cited

U.S. PATENT DOCUMENTS

| | | |
|---|---|---|
| 6,435,298 B1 | 8/2002 | Mizuno et al. |
| 7,678,208 B2 | 3/2010 | Bodin |
| 8,118,954 B2 | 2/2012 | Beenken et al. |
| 8,382,199 B2 | 2/2013 | Bodin |
| 8,672,359 B2* | 3/2014 | Ohashi ................ B60K 1/04 180/69.4 |
| 8,691,032 B2 | 4/2014 | Thomas et al. |
| 9,039,073 B2 | 5/2015 | Yajima et al. |
| 9,283,908 B2 | 3/2016 | Blumel et al. |
| 9,308,564 B2 | 4/2016 | Potocki et al. |
| 9,359,663 B2 | 6/2016 | Mizuta et al. |
| 10,093,176 B2* | 10/2018 | Muramatsu ............ B60K 15/07 |
| 2002/0180244 A1* | 12/2002 | Kosuge ................ B62D 21/157 296/204 |
| 2003/0042057 A1* | 3/2003 | Kawazu ................ B60K 15/07 180/69.4 |
| 2005/0161935 A1* | 7/2005 | Ono ........................ B60K 15/07 280/834 |
| 2005/0211496 A1* | 9/2005 | Ito ......................... B60K 15/063 180/314 |
| 2009/0045638 A1 | 2/2009 | Handing et al. |
| 2010/0084892 A1* | 4/2010 | Yoshida ................. B21D 7/08 296/203.02 |
| 2010/0327626 A1* | 12/2010 | Baumann ............... B62D 21/15 296/187.09 |
| 2012/0006089 A1* | 1/2012 | Pohl ....................... C21D 1/673 72/364 |
| 2012/0304448 A1 | 12/2012 | Hartmann et al. |
| 2013/0136945 A1 | 5/2013 | Charest et al. |
| 2013/0229030 A1* | 9/2013 | Yamaguchi ............ B60K 1/04 296/193.07 |
| 2014/0117716 A1* | 5/2014 | Patberg ................. B62D 21/157 296/187.08 |
| 2014/0333056 A1* | 11/2014 | Yoshida ............... B62D 21/155 280/834 |
| 2015/0158530 A1* | 6/2015 | Mikami .................. B62D 21/11 280/782 |
| 2015/0217810 A1* | 8/2015 | Terada ................. B62D 25/087 280/783 |
| 2015/0239504 A1* | 8/2015 | Lohmann ............. B62D 25/025 296/187.11 |
| 2017/0051371 A1 | 2/2017 | Chauvin et al. |
| 2017/0113540 A1* | 4/2017 | Sakurada .......... B60K 15/03006 |
| 2017/0217496 A1* | 8/2017 | Langhoff ............. B62D 21/155 |
| 2017/0217498 A1* | 8/2017 | Akhlaque-e-rasul .... B60K 1/04 |
| 2017/0297631 A1* | 10/2017 | Schneider ............. B62D 25/20 |
| 2017/0341684 A1* | 11/2017 | Goldyn .................. B62D 25/04 |
| 2018/0237877 A1* | 8/2018 | Wang ................... C21D 9/0068 |

FOREIGN PATENT DOCUMENTS

| | | |
|---|---|---|
| WO | 2016097224 A1 | 6/2016 |
| WO | 2017015280 A1 | 1/2017 |

\* cited by examiner

VEHICLE UNDERBODY COMPONENT PROTECTION ASSEMBLY

TECHNICAL FIELD

This disclosure relates to an assembly for a vehicle underbody having a vehicle component protection assembly made of thermally treated components.

BACKGROUND

Automotive manufacturers are driven to design light weight vehicle with increased crash performance and reduced fuel consumption. The manufacturers have transitioned from a usage of mild steels for vehicle components to advanced high strength steels, ultra-high strength steels, and aluminum. Hot stamping processes for vehicle components can create fully martensitic structures. Hot stamping processes may create vehicle components with undesirable qualities. For example, hot stamping processes may result in vehicle components having joining issues, structural rigidity issues, and deformation issues when subjected to an impact.

This disclosure is directed to solving the above problems and other problems as summarized below.

SUMMARY

A vehicle underbody assembly includes a pair of rockers, a pair of side rails, a first cross member, a second cross member, and a fuel tank. Each of the pair of side rails is secured to a rearward portion of one of the rockers. The first cross member extends between the side rails and is thermally treated to form a first central hard strength zone between two first soft strength zones. The second cross member is arranged with the pair of side rails and the first cross member to form a rectilinear frame and is thermally treated to form a second central hard strength zone between two second soft strength zones. The fuel tank is secured between the pair of side rails so that the fuel tank is located within a rectilinear frame formed by the pair of side rails and the cross members. The assembly may further include a first longitudinal member and a second longitudinal member. The first longitudinal member and the second longitudinal member may each be thermally treated to define a fully martensitic microstructure. The first longitudinal member and the second longitudinal member may span between the first cross member and the second cross member to further form the fuel tank protection assembly. Each of the soft strength zones may extend outboard of the fuel tank. A seat frame assembly may be secured to one of the first cross member at the first central hard strength zone or the second cross member at the second central hard strength zone so that each of the soft strength zones of the first cross member and the second cross member extends outboard of the seat frame assembly. A length of each of the two first soft strength zones may be between thirty percent and thirty-three percent of a length of the first cross member and a length of each of the two second soft strength zones may be between thirty and thirty-two percent of a length of the second cross member. The second cross member may further include a U-shaped portion at the second central hard strength zone sized to accommodate a portion of a drive axle. The hard strength zones of the first cross member and the second cross member may be thermally treated at a temperature at or above 900 degrees Celsius. The central hard strength zones of the first cross member and the second cross member may be thermally treated to form a fully martensitic microstructure. The central hard strength zones of the first cross member and the second cross member may have a tensile strength of between 1000 MPa and 1900 MPa. A length of each of the two first soft strength zones may be approximately 440 millimeters and a length of each of the two second soft strength zones may be approximately 340 millimeters.

A method for creating a vehicle component protection assembly includes thermally treating first and second blanks to each form a central hard strength zone and soft strength zones on either side of the central hard strength zone, forming the first blank into a first cross member and forming the second blank into a second cross member, securing the first cross member and the second cross member between two vehicle side rails, and arranging the cross members and the side rails with one another to form a rectilinear frame for protecting a vehicle component in which each of the soft strength zones extends from a respective hard strength zone and outboard of the vehicle component. The thermally treating to form the central hard strength zones may be a heating process at a temperature at or above 900 degrees Celsius to form a fully martensitic microstructure. The thermally treating to form the central hard strength zones may be a cooling process at a rate of between 28 degrees Celsius per second and 100 degrees Celsius per second to form a fully martensitic microstructure.

A vehicle component protection assembly includes first and second cross members for extending between side rails. Each of the cross members includes two ends on either side of a central region. The two ends each have a tensile strength less than a tensile strength of the central regions so that each of the ends deforms between zero and three-hundred forty millimeters to absorb energy from a side impact prior to the energy reaching the central regions. The first and second cross members may be arranged with one another so that deformation of each of the ends as a result of an impact of 5,000 to 15,000 lbf is such that the side rails do not contact a fuel tank mounted to the first and second cross members. The assembly may include a pair of longitudinal members secured between the first and second cross members. The first and second cross members, the side rails, and the pair of longitudinal members may be arranged with one another to form a rectilinear frame to prevent or minimize impact to a fuel tank or traction battery mounted to one of the first and second cross members or one of the pair of longitudinal members. The central regions and the pair of longitudinal members may be cooled at a cooling rate of 100 degrees Celsius per second to form fully martensitic microstructures. The central regions and the pair of longitudinal members may be heated at or above 900 degrees Celsius to form fully martensitic microstructures. Each of the central regions may have a tensile strength of 1000 to 1900 MPa and each of the two ends may have a tensile strength of 400 to 600 MPa. A seat frame assembly may be mounted to a hard strength zone of one of the cross members or the longitudinal members so that each of the two ends of the first cross member and the second cross member extends outboard of the seat assembly. The seat frame assembly may be mounted to a hard strength zone of one of the cross members of the longitudinal members so that deformation of each of the two ends as a result of an impact of 5,000 to 15,000 lbf is such that the side rails do not contact the seat assembly.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
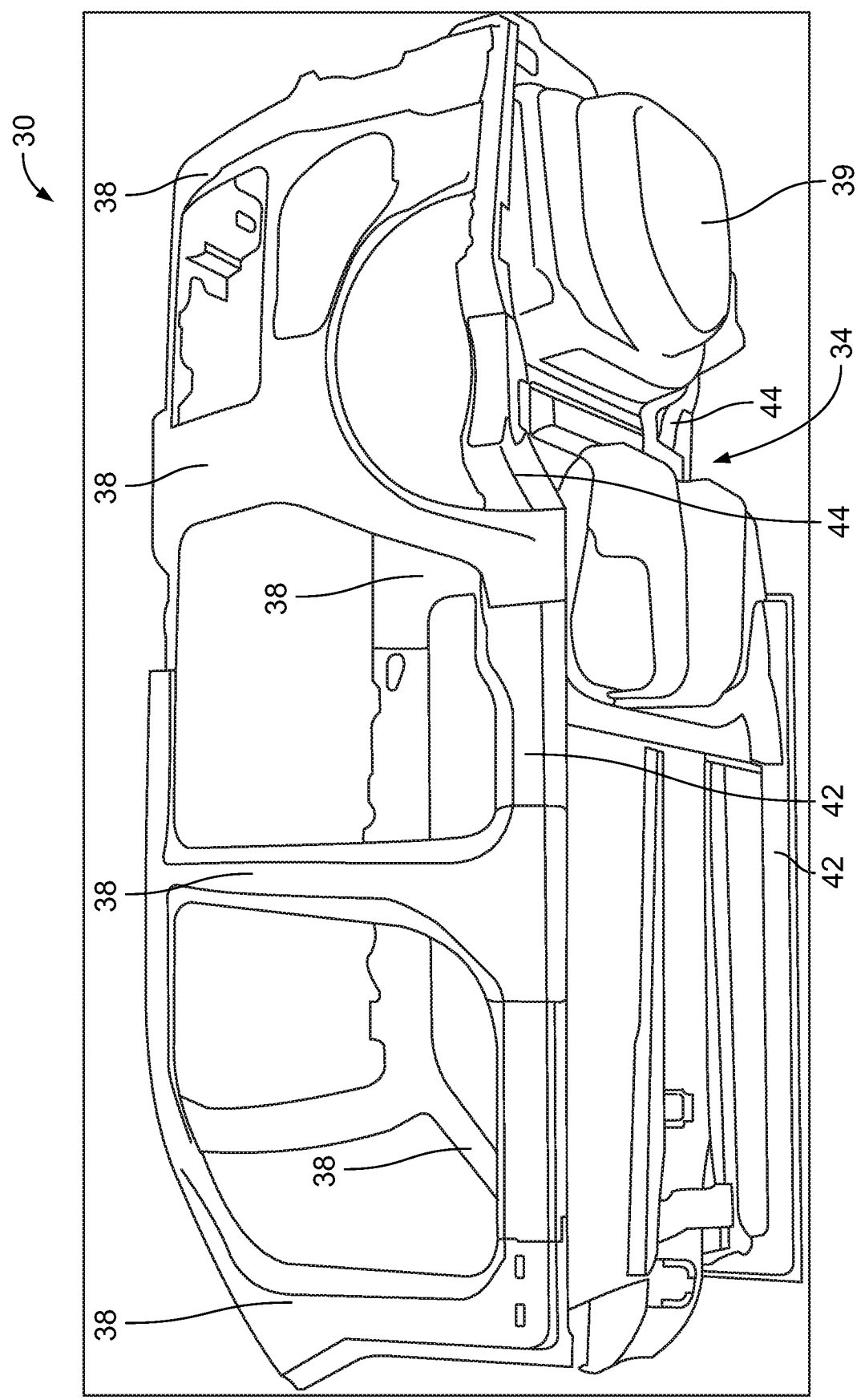
FIG. 1 is a lower side perspective view of an example of a portion of a vehicle body.

FIG. 1 shows an example of a vehicle body, generally referred to as a vehicle body 30. The vehicle body 30 includes an underbody assembly 34 and a plurality of pillars 38. A tire tub 39 is mounted to the underbody assembly 34. The underbody assembly 34 includes a pair of rockers 42 and a pair of side rails 44. Each of the pillars 40 is secured to one of the pair of rockers 42. Each of the side rails 44 is secured to a rearward portion of one of the pair of rockers 42. The tire tub 39 is secured between the pair of side rails 44 at a rearward portion of the vehicle body 30.

Figure 2:
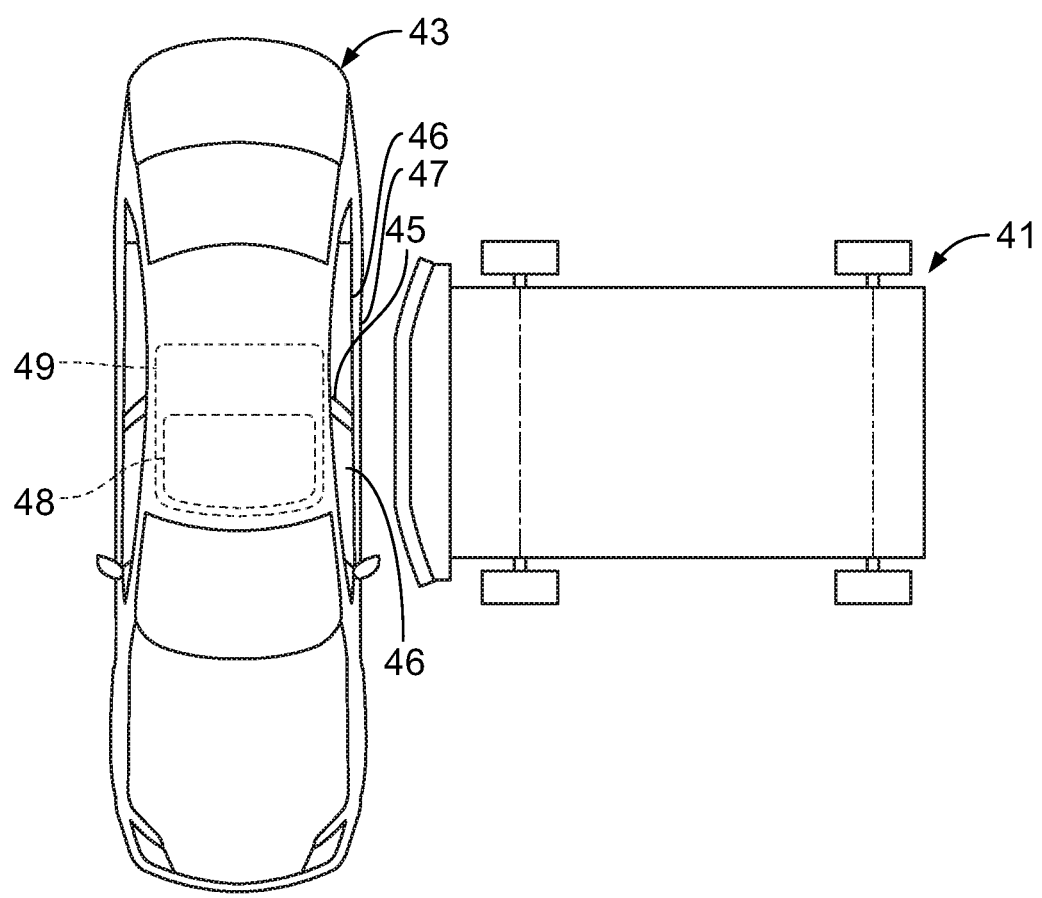
FIG. 2 is a top plan view illustrating an example of a vehicle and a test crash sled.

FIG. 2 is a schematic diagram showing an example of a vehicle 43 and a crash test sled 41 for an Insurance Institute for Highway Safety (IIHS) side impact crash test. The IIHS side impact crash test simulates a vehicle side impact by directing the crash test sled 41 into a side of the vehicle 43. In this crash test, components of the vehicle 43 are tested to withstand an impact load of a mass of 1500 kg at a velocity of 50 km/h. For example, components of the vehicle 43 subjected to the impact load include a B-pillar 45, a door 46, a side rail 47, a seat assembly 48, and a fuel tank 49. Protection of the seat assembly 48 and the fuel tank 49 during receipt of the impact load may be improved by mounting the seat assembly 48 and the fuel tank 49 to an underbody assembly with a vehicle component protection assembly having thermally treated components.

Figure 3A:
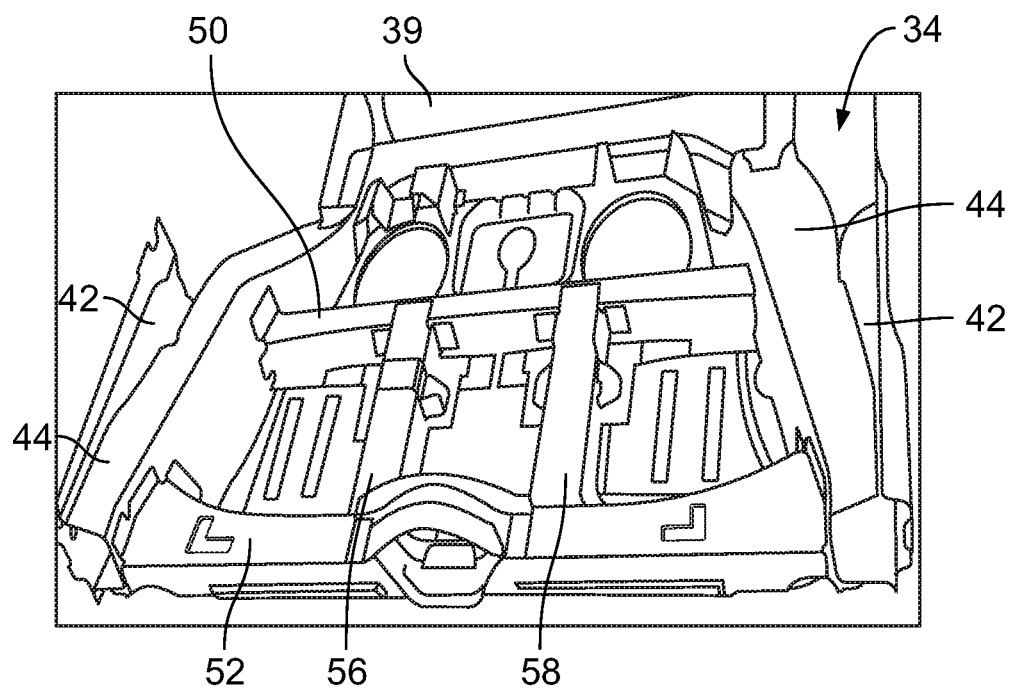
FIG. 3A is a fragmentary lower perspective view of the example of the portion of the vehicle body of FIG. 1 illustrating an example of an underbody assembly.
Figure 3B:
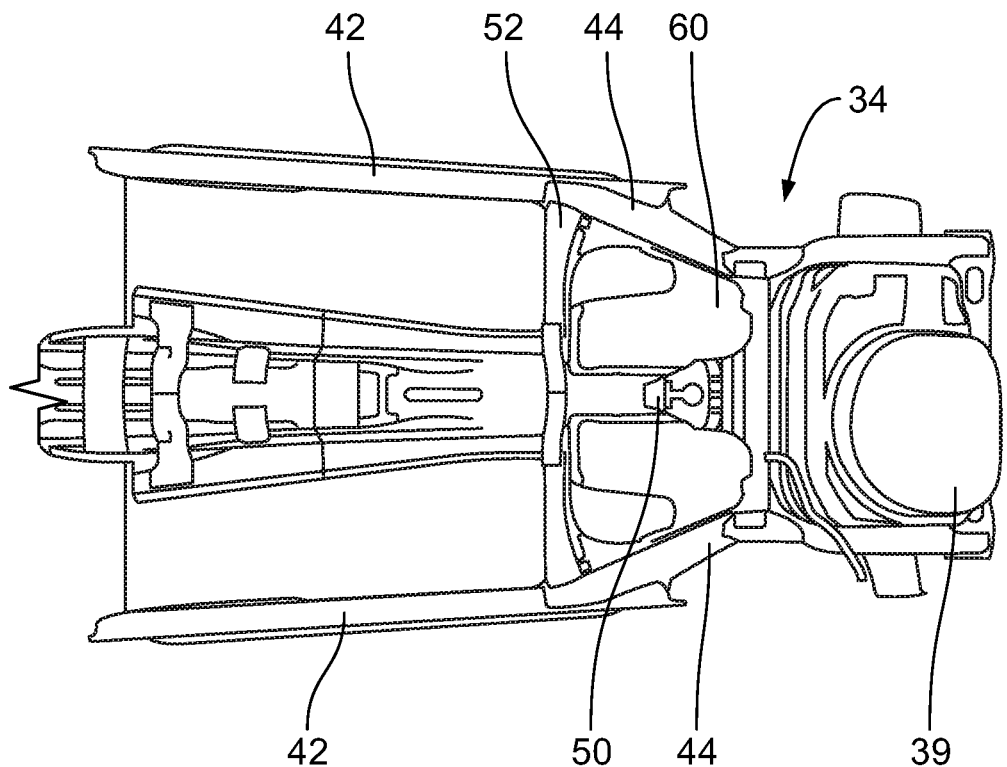
FIG. 3B is a fragmentary lower perspective view of the example of the portion of the vehicle body of FIG. 1 illustrating an example of a fuel tank mounted to the underbody assembly of FIG. 3A.

FIGS. 3A and 3B show further detail of the underbody assembly 34. The underbody assembly 34 further includes a first cross member 50, a second cross member 52, a first longitudinal member 56, and a second longitudinal member 58. Each of the first cross member 50 and the second cross member 52 extend between the side rails 44 and are spaced from one another. For example, the first cross member 50 may extend between regions of the side rails 44 which transition inboard. The second cross member 52 may extend between regions adjacent the pillars 38 such as vehicle B-pillars or C-pillars. The side rails 44 and the cross members may be arranged with one another to form a rectilinear frame.

Each of the first longitudinal member 56 and the second longitudinal member 58 extend between the cross members and are spaced from one another. The first longitudinal member 56 and the second longitudinal member 58 may be spaced equidistant from a vehicle longitudinal centerline. In addition to providing structural reinforcement to the underbody assembly 34 for loads received from a side impact, the first longitudinal member 56 and the second longitudinal member 58 provide structural reinforcement to the underbody assembly 34 for loads received from a rear impact.

A fuel tank 60 may be mounted to one or more of the first cross member 50, the second cross member 52, the first longitudinal member 56, and the second longitudinal member 58. The side rails 44, the first cross member 50, the second cross member 52, the first longitudinal member 56, and the second longitudinal member 58 are arranged with one another to define a protection assembly for the fuel tank 60 to assist in preventing or limiting contact to the fuel tank 60 by other vehicle components due to a vehicle impact. While in this example the fuel tank 60 is described, it is contemplated that other suitably sized vehicle components, such as a traction battery, may be mounted in a position similar to a location of the fuel tank 60 as shown in FIG. 3B to receive similar protection benefits of the protection assembly.

Figure 4:
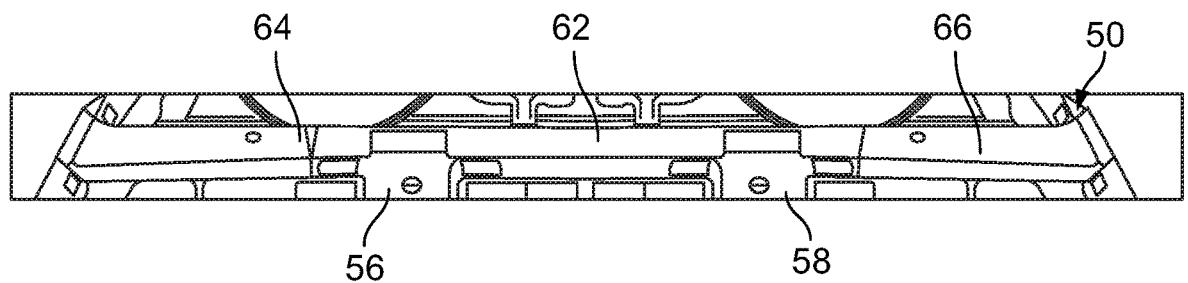
FIG. 4 is a perspective view of an example of a first cross member of the underbody assembly of FIG. 3A.

FIG. 4 shows further detail of the first cross member 50. The first cross member 50 and the second cross member 52 may be dual phase (DP) metal or high-strength low-alloy steel (HSLA). The first cross member 50 may be thermally treated to form varied strength zones. The first cross member 50 may be thermally treated to form a hard strength zone at a central region 62 and soft strength zones on either side of the central region 62 at a first end 64 and a second end 66. In one example, the central region 62 may have a length of 470 millimeters and each of the first end 64 and the second end 66 may have a length of 440 millimeters.

The central region 62 may have a tensile strength of 1000 to 1900 MPa. Each of the first end 64 and the second end 66 may have a tensile strength of 400 to 600 MPa. The thermal treatment may form a fully martensitic structure for the central region 62 by heating the central region 62 at or above 900 degrees Celsius. A blank for the first cross member 50 may be arranged within a furnace or other heat generating device so that the first end 64 and the second end 66 do not receive enough heat to change microstructure. As such, the first end 64 and the second end 66 may have a ferrite and/or pearlite microstructure.

Figure 5:
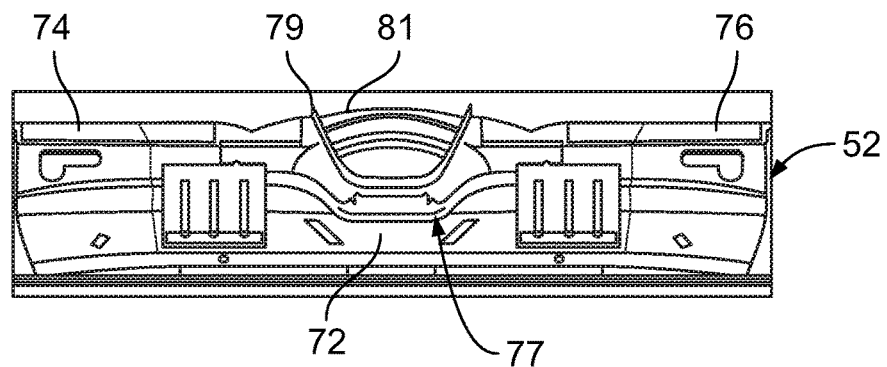
FIG. 5 is a front elevation view of an example of a second cross member of the underbody assembly of FIG. 3A.

FIG. 5 shows further detail of the second cross member 52. The second cross member 52 may be DP steel or HSLA steel. The second cross member 52 may be thermally treated to form varied strength zones. For example, the second cross member 52 may be thermally treated to form a hard strength zone at a central region 72 and soft strength zones on either side of the central region 72 at a first end 74 and a second end 76. In one example, the central region 72 may have a length of 390 millimeters and each of the first end 74 and the second end 76 may have a length of 340 millimeters.

The central region 72 may have a tensile strength of 1000 to 1900 MPa. Each of the first end 74 and the second end 76 may have a tensile strength of 400 to 600 MPa. The thermal treatment may form a fully martensitic structure for the central region 72 by heating the central region 72 at or above 900 degrees Celsius. A blank for the second cross member 52 may be arranged within a furnace or other heat generating device so that the first end 74 and the second end 76 do not receive enough heat to change microstructure. As such, the first end 74 and the second end 76 may have a ferrite and/or pearlite microstructure.

The second cross member 52 may be formed to have a profile to accommodate a drive axle extending along a base of the vehicle body 30. For example, the central region 72 of the second cross member 52 may be formed to include a U-shaped portion 77. A lower bracket 79 may be mounted to the second cross member 52 and sized to sit within the U-shaped portion 77. An upper bracket 81 may be mounted to the lower bracket 79 to define an opening therebetween for the drive axle to extend therethrough. If a portion of the second cross member 52 is not thermally treated to define a hard strength zone, the second cross member 52 may bend and fail to absorb crash energy at the U-shaped portion 77 when subjected to axial loads such as the impact force described in the IIHS side impact test above. The brackets and the hard strength zone of the U-shaped portion 77 are arranged with one another to provide structural rigidity to the second cross member 52 when subjected to axial loads while also accommodating the drive axle. Thermally treating the central region 72 of the second cross member 52 to form a hard strength zone addresses a geometry weakness of the U-shaped portion 77 and reduces a weight of the second cross member 52. The soft strength zones of the first cross member 50 and the second cross member 52 also reduce welding or joining efforts to secure the second cross member 52 to surrounding components thereto.

Figure 6:
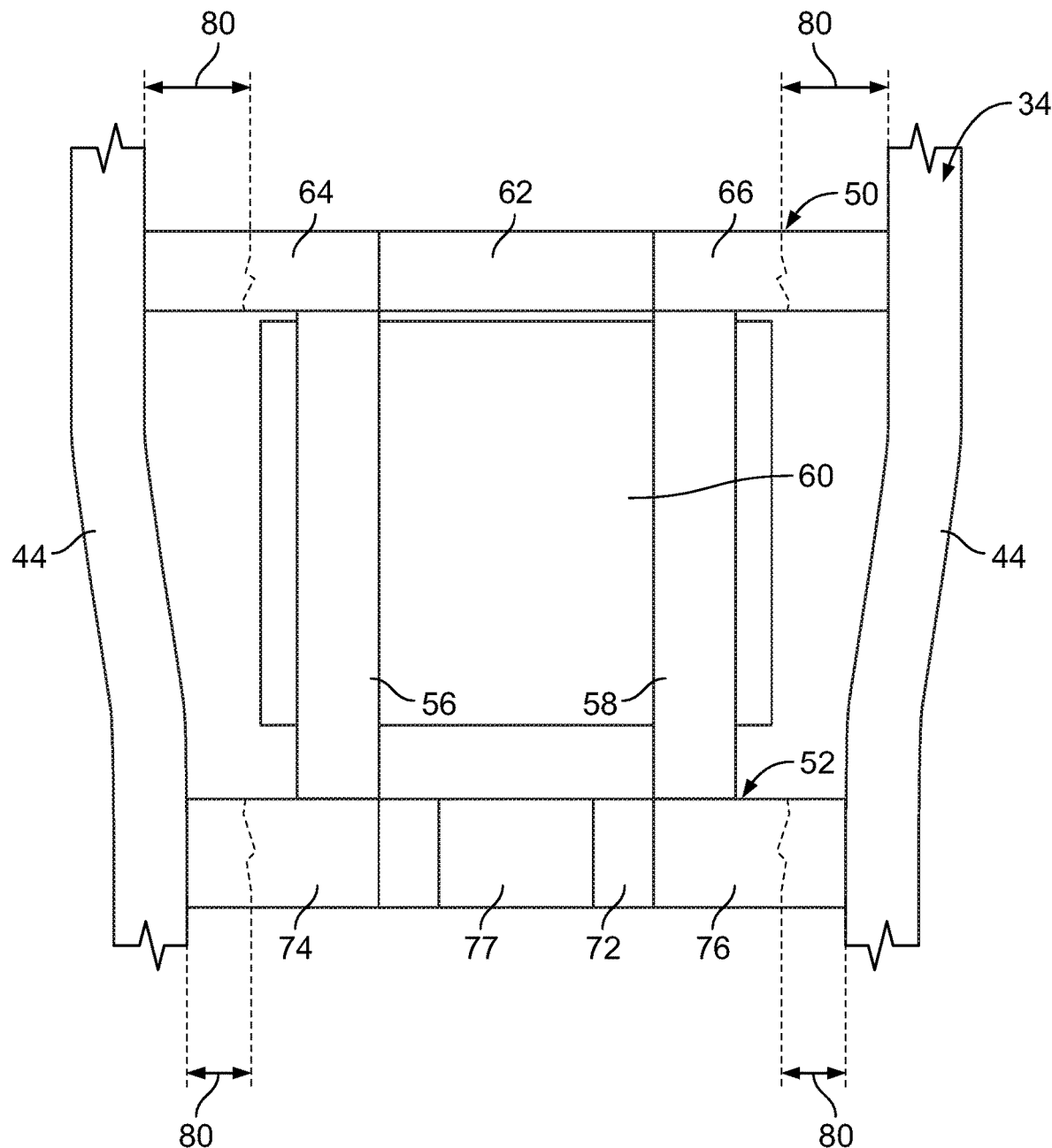
FIG. 6 is a schematic top plan view of the underbody assembly of FIG. 3A illustrating a fuel tank mounted to the underbody assembly.

FIG. 6 is a schematic diagram from a top plan view showing the fuel tank 60 mounted to the underbody assembly 34 in a location to receive protection from the protection assembly. This protection assembly reduces a number of reinforcement components in the underbody assembly 34 in comparison to prior art underbody assemblies. For example, prior art examples of side rails include reinforcement components mounted thereto to increase structural rigidity of the underbody assembly. The underbody assembly 34 may achieve this increased structural rigidity without the reinforcement components by thermally treating components of the protection assembly as described herein.

The protection assembly assists in managing energy received by the vehicle body 30 from an impact, such as a side impact described above in the IIHS side impact test. Thermally treating the ends of the first cross member 50 and the second cross member 52 to form strength zones having a lower tensile strength than the respective central regions may create a lower strength material area for creating a "living hinge" or hinge joint to absorb energy and minimize deformation into the fuel tank region and the seat assembly region when the vehicle body 30 is subjected to a side impact. For example, soft strength zones of the ends of the first cross member 50 and the second cross member 52 provide additional crash distance or deformation distance to minimize or prevent a side-impacted vehicle component from entering a fuel tank region defined by the fuel tank 60.

Each of the ends of the first and the second cross members may be thermally treated to form a microstructure such that the respective end may deform a maximum length 80 when subjected to a side impact of 5,000 to 15,000 lbf. In one example, a length of each of the ends of the first cross member 50 is between thirty percent and thirty-three percent of a length of the first cross member 50 to provide deformation and energy absorption. In another example, a length of each of the ends of the second cross member 52 is between thirty and thirty-two percent of a length of the second cross member to provide deformation and energy absorption. The microstructure of each of the ends of the first cross member 50 and the second cross member 52 may be tuned for deformation based on a size of the fuel tank 60 or a size of the vehicle component. A location of soft strength zones at crush contact areas assists in facilitating sectional collapse of the first cross member 50 and the second cross member 52 to provide additional energy absorption before the impact load reaches the hard strength zone of the respective central region.

Figure 7:
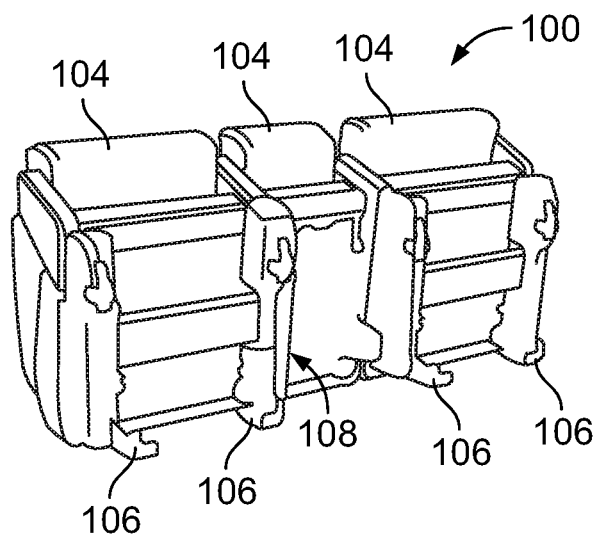
FIG. 7 is a perspective view of an example of a seat frame assembly.

The protection assembly may also assist in protecting other vehicle components, such as a seat frame assembly. FIG. 7 shows an example of a seat frame assembly, referred to as a seat frame assembly 100 herein. The seat frame assembly 100 includes seats 104, seat adjusters 106, a restraint seat frame 108, a seat back upper crossbar (not visible in FIG. 7), and seat frame fasteners to secure the components to one another. The seat adjusters 106 are for adjusting the seats 104 fore and aft and are anchored to one or more of the components of the protection assembly. The restraint seat frame 108 restricts longitudinal movement of a hinged or folding seat frame or seat back. The seat back upper crossbar provides lateral support to the seat frame assembly 100. As mentioned above, the IIHS side impact test measures a performance of whether vehicle components contact seat frame assemblies when the vehicle is subjected to a side impact.

Figure 8:
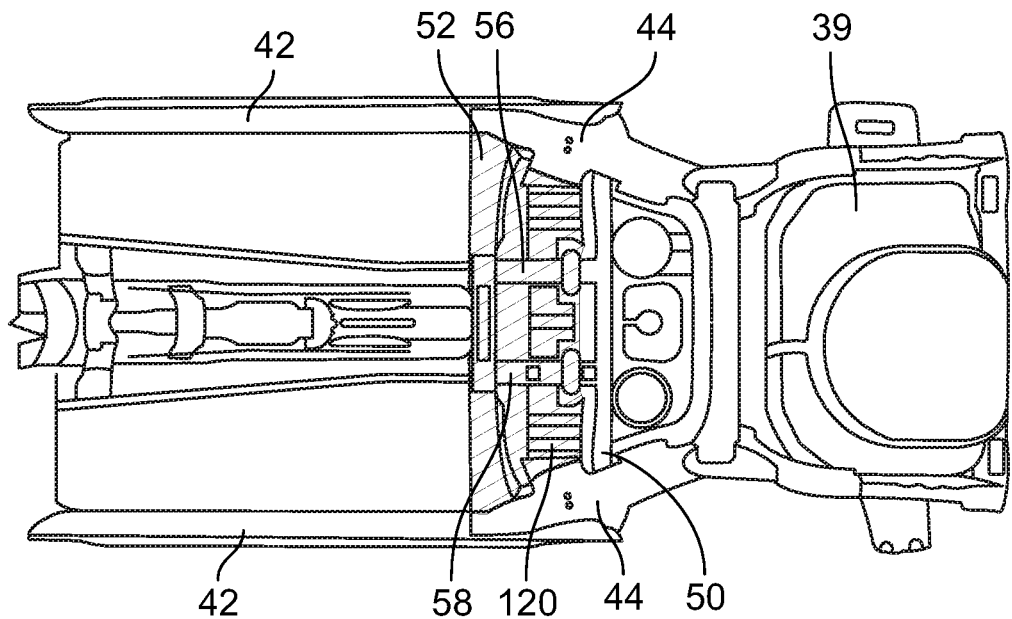
FIG. 8 is an upper perspective view of the underbody assembly of FIG. 3A illustrating a mount zone for the seat frame assembly of FIG. 7.

FIG. 8 shows an example of a mount zone 120 for the seat frame assembly 100. The seat frame assembly 100 may be mounted to a hard strength zone of one of the first cross member 50, the second cross member 52, the first longitudinal member 56, or the second longitudinal member 58. Mounting the seat frame assembly 100 to a thermally treated hard strength zone of the underbody assembly 34 provides similar benefits to those described above in relation to using thermally treated components to protect the fuel tank 60.

Figure 9:
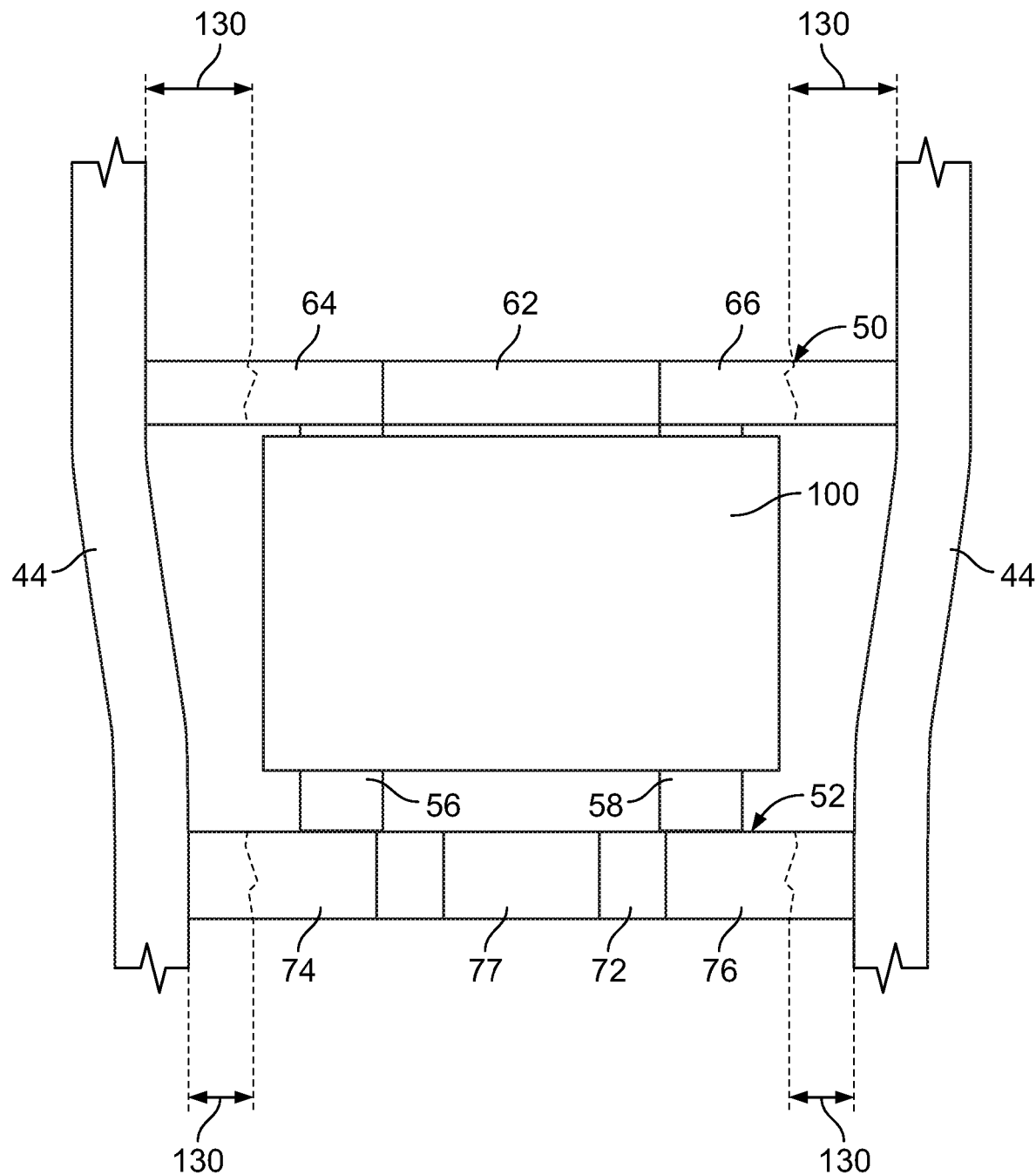
FIG. 9 is a schematic top plan view of the underbody assembly of FIG. 3A illustrating a seat frame assembly mounted to the underbody assembly.

For example, FIG. 9 is a schematic diagram showing the seat frame assembly 100 mounted to the underbody assembly 34. The protection assembly assists in managing energy received by the vehicle body 30 to protect the seat frame assembly 100. For example, soft strength zones of the ends of the first cross member 50 and the second cross member 52 provide additional crash distance or deformation distance to minimize or prevent a side-impacted vehicle component from entering a seat assembly region defined by the seat frame assembly 100. Each of the ends of the first cross member 50 and the second cross member 52 may be formed to define a microstructure such that the respective end may deform a maximum length 130 when subjected to a side impact of 5,000 to 15,000 lbf. As described above, a length of each of the ends of the first cross member 50 may be between thirty percent and thirty-three percent of a length of the first cross member 50 to provide deformation and energy absorption. In another example, a length of each of the ends of the second cross member 52 may be between thirty and thirty-two percent of a length of the second cross member to provide deformation and energy absorption. The microstructure of each of the ends of the first cross member 50 and the second cross member 52 may be tuned for deformation based on the seat assembly region defined by the seat frame assembly 100. A location of soft strength zones at crush contact areas assists in facilitating sectional collapse of the first cross member 50 and the second cross member 52 to provide additional energy absorption before the impact energy reaches the hard strength zone of the respective central region.

To facilitate formation of the varied strength zones, portions of a blank may be heated through either uniform or tailored heating. The heated blank may then be inserted into a die for desired component forming. With uniform heating, the blank may be heated above an austenetizing temperature, referred to as Ac3. A temperature range associated with Ac3 may be between 800 and 850 degrees Celsius. With tailored heating, different portions of the blank may be heated to different temperatures to form different strength zones, such as hard, medium, and soft.

Alternatively, portions of a blank may be cooled at different rates to form different strength zones. The hard strength zone may be quenched above a critical cooling rate, such as a rate of 100 degrees Celsius per second (C/s). The critical cooling rate is a minimum continuous cooling rate to prevent undesired phase transformation of the blank. For example, the critical cooling rate for the first cross member 50, the second cross member 52, the first longitudinal member 56, and the second longitudinal member 58 may be between 28 and 30 C/s. A medium strength zone may be a zone including a partially austenitized portion of a component cooled at a rate below the critical cooling rate, such as a rate between 10 and 20 C/s. A soft strength zone may be a zone in which the component has characteristics as delivered and in which the component is not austenitized.

Figure 10:
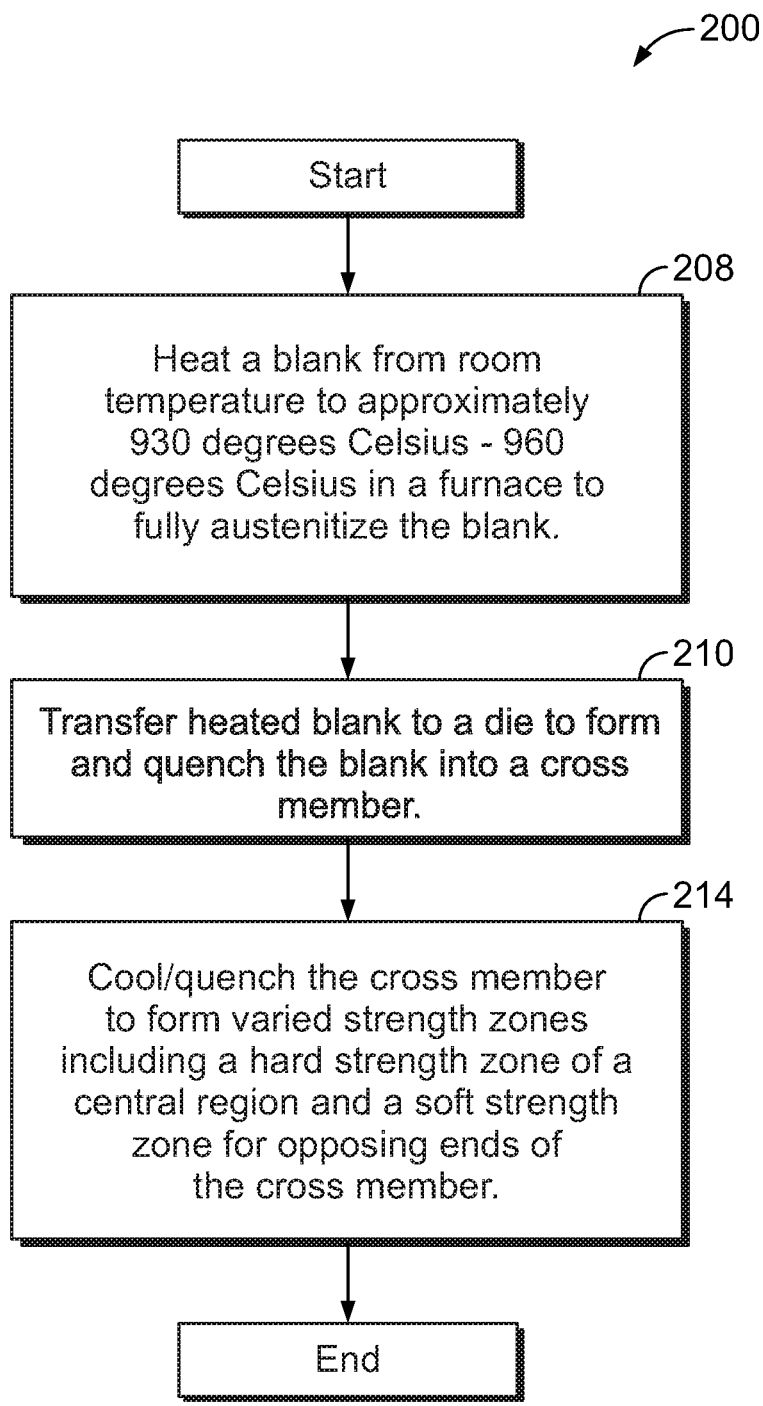
FIG. 10 is a flow chart of an example of a method of creating components of a vehicle component protection assembly.

FIG. 10 is a flow chart illustrating an example of a method of thermally treating a blank to form a vehicle component using a monolithic hot stamping process, referred to generally as a method 200. The vehicle component may be part of a vehicle component protection assembly as described above. In operation 206 a blank may be heated from room temperature to approximately 900 degrees Celsius in a furnace to fully austenitize the blank. In operation 210, the heated blank may then be transferred to a die where the blank may be formed into a desired shape and rapidly cooled. In one example, the blank may be formed into one of the components of the underbody assembly 34. The blank may have a temperature of approximately 700 to 800 degrees Celsius and may be positioned within the die for cooling at between approximately 28 C/s and 100 C/s. Cooling the blank at this rate results in achieving a fully martensitic structure of the blank having a tensile strength of approximately 1300 to 1600 MPa at room temperature. Cooling times may vary based on a thickness of the blank.

In operation 214, the cooling process may be an annealing process or a quenching process tailored to further define varied strength zones. The annealing process is a slower process to use when equilibrium structures are desired. The quenching process is a faster process to use when non-equilibrium structures are desired. A typical hot stamping process may use the quenching process by applying water to the heated blank when positioned within the die.

Figure 11:
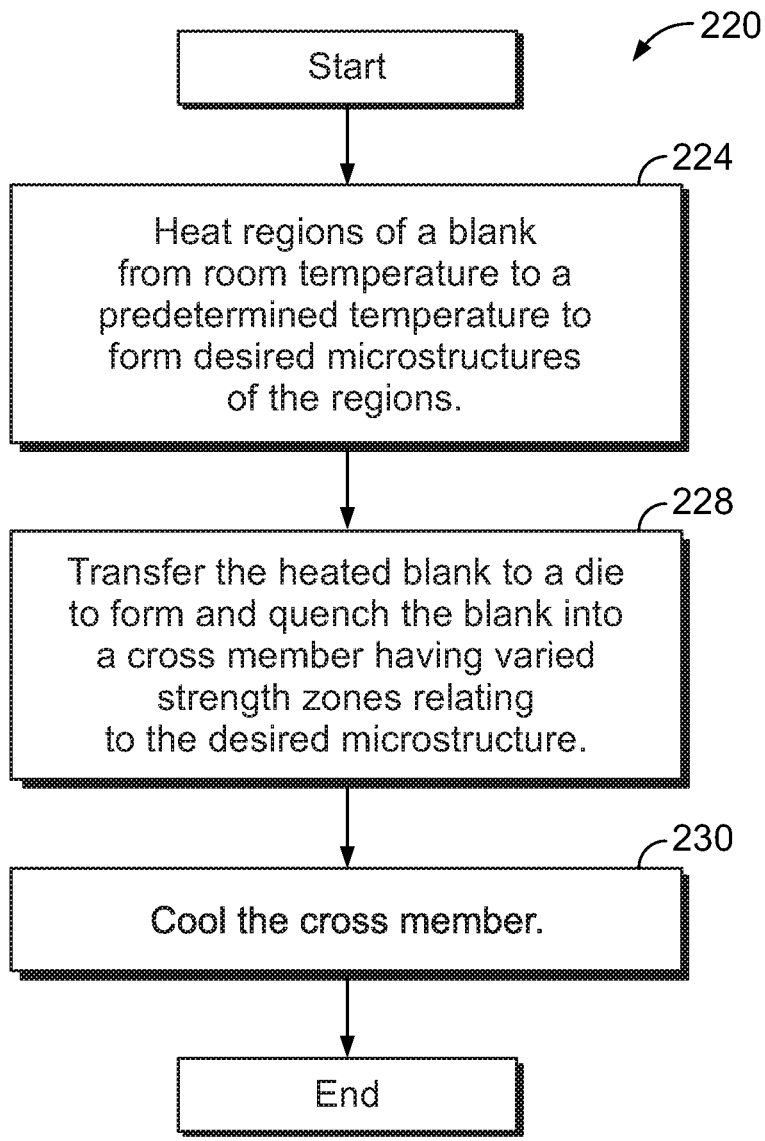
FIG. 11 is a flow chart of an example of another method of creating components of a vehicle component protection assembly.

FIG. 11 is a flow chart illustrating an example of a method of thermally treating a vehicle blank to form a vehicle component using a monolithic hot stamping process, referred to generally as a method 220. The vehicle component may be part of a vehicle component protection assembly as described above. In operation 224, a section of a blank may be heated to a predetermined temperature to achieve a desired microstructure so that varied strength zones are formed along the blank. For example, one or more portions of the blank may be treated to a temperature at or above 900 degrees Celsius to form characteristics of a hard strength zone. A desired microstructure associated with the hard strength zone may be fully martensitic. One or more portions of the blank may be treated to a temperature between 700 and 900 degrees Celsius to form characteristics of a medium strength zone. A desired microstructure associated with the medium strength zone may include one or more of ferrite, pearlite, martensite and bainite. One or more portions of the blank may be treated to a temperature below 700 degrees Celsius to retain characteristics of a soft strength zone. A desired microstructure associated with a soft strength zone may be ferrite and or pearlite. Alternatively, the blank may be arranged with the furnace so that one or more portions of the blank are not subjected to heat or receive minimal heat to retain characteristics of a soft strength zone.

In operation 228, the heated blank may then be transferred to a die where the blank may be formed into a desired component shape. In one example, the blank may be formed into one of the components of the underbody assembly 34 having varied strength zones.

In operation 230, the formed component may be cooled. The cooling process may be an annealing process or a quenching process. The annealing process is a slower process to use when equilibrium structures are desired. The quenching process is a faster process to use when non-equilibrium structures are desired. A typical hot stamping process may use the quenching process by applying water to the heated blank when positioned within the die.

Figure 12:
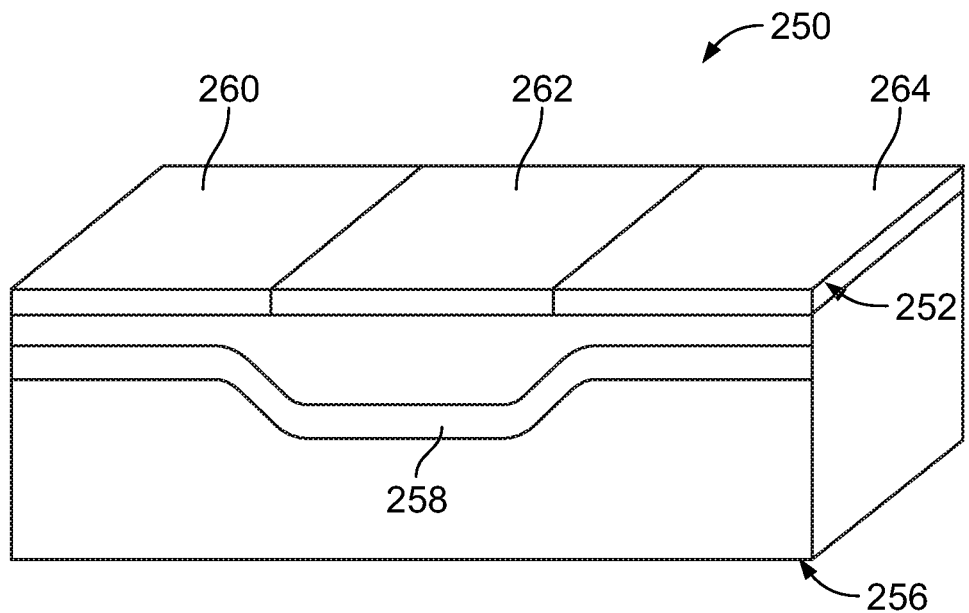
FIG. 12 is an illustrative schematic view of an example of a die assembly and a blank.

The cooling portion of the hot stamping process may also use spacing between the blank and a cooling channel to obtain varied strength zones. For example, FIG. 12 is a schematic diagram showing an example of a die assembly 250 supporting a blank 252. A die 256 may include a coolant channel 258. The coolant channel 258 may be shaped within the die 256 to have varied spacing from the blank 252 to achieve varied material structures and strength zones of the blank 252. The blank 252 may have uniform properties across the blank 252 prior to being positioned within the die 256. Portions of the blank 252 located closer to the coolant channel 258 are subject to rapid cooling/quenching to obtain the martensitic structure. Portions of the blank 252 located further away from the coolant channel 258 are subject to a slower cooling/quenching to obtain a pearlite structure. In this example, the spacing and shape of the coolant channel 258 relative to the blank 252 may result in having a first martensitic portion 260, a pearlite portion 262, and a second martensitic portion 264.

Figure 13:
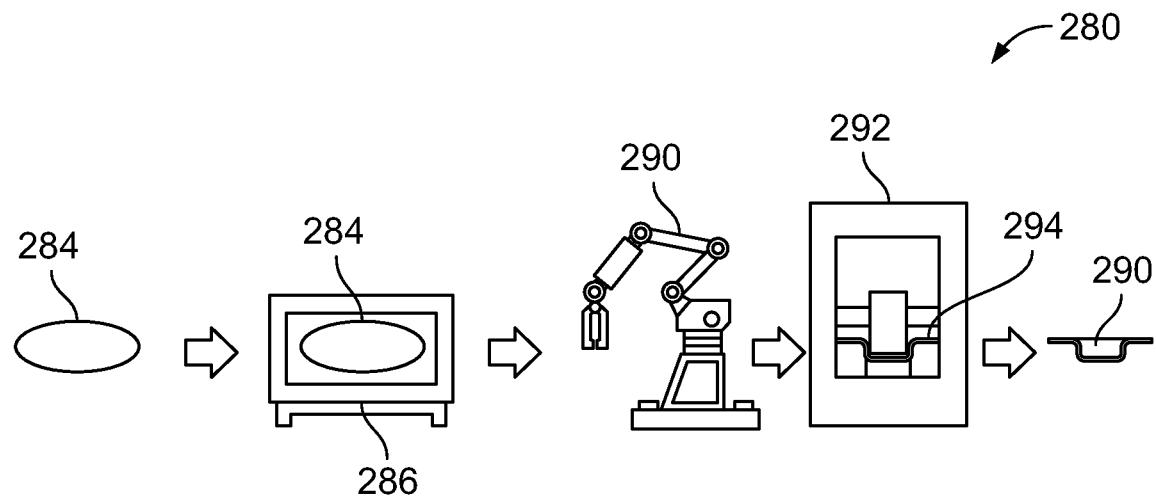
FIG. 13 is diagrammatic view showing an example of a hot stamping process.

FIG. 13 is a diagrammatic view of an example of a hot-stamping line that may be used to manufacture an DHSS vehicle body component, referred to generally herein as a hot-stamping process 280. Hot-stamping is a process of stamping a blank while the metal is very hot, usually in excess of 600 degrees Celsius, and subsequently quenching the formed blank in a closed die. The hot-stamping process may convert low-strength blanks to high-strength components having varied strength zones as described above. For example, the finished component may have a yield strength of about 150 to 230 kilo pounds per square inch.

In the hot-stamping process 280, a boron steel blank 284 (which may be press-hardenable steel) is placed in a furnace 286 and heated above a phase transformation temperature forming austenite. The phase transformation temperature is the transformation temperature at which ferrite fully transforms into austenite. For example, the blank 284 may be heated at 900 to 950 degrees Celsius for a predetermined time in the furnace 286. The bake time and furnace temperature may vary depending on the material of the blank 284 and desired properties of the finished part. After heating, a robotic transfer system 290 may transfer the blank 284, now austenitized, to a press 292 having a die 294. The die 294 stamps the blank 284 into a desired shape while the blank 284 is still hot to form one or more components 298 from the blank 284. The component 298 is then quenched while the die 294 is still closed using water or other coolant as described above. Quenching may be provided at a cooling speed of 30 to 150 C/s for a predetermined duration at the bottom of the stroke. Under certain conditions, the quenching may change the microstructure of the blank from austenite to martensite. After quenching, the component 298 is removed from the press 292 while the component is still hot (e.g., about 150 degrees Celsius). The component 298 may then be cooled on racks.

A hot-stamping process may provide numerous advantages over other high-strength steel forming methods such as cold-stamping. One advantage of hot-stamping is a reduced spring back and warping of the blank. Hot-stamping also allows complex shapes to be formed in a single stroke of the die to reduce downstream processing and increase efficiency in the manufacturing of the vehicle component from the blank.

Hot-stamping components may be both lightweight and strong. Examples of automotive components that may be formed by hot-stamping may include: body pillars, rockers, rails, bumpers, intrusion beams, carrier understructure, mounting plates, front tunnels, front and rear bumpers, reinforcement members, and side rails. Higher strength zones of the components provide increased resistance to resist deformation during an impact while softer strength zones may be placed in locations where the component is to be attached to other components or where deformation is desired.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle underbody assembly comprising:
   a pair of rockers;
   a pair of side rails each secured to a rearward portion of one of the rockers;
   a first cross member extending between the side rails and thermally treated to form a first central hard strength zone between two first soft strength zones;
   a second cross member arranged with the pair of side rails and the first cross member to form a rectilinear frame and thermally treated to form a second central hard strength zone between two second soft strength zones;
   a first longitudinal member thermally treated to define a fully martensitic microstructure; and
   a second longitudinal member thermally treated to define a fully martensitic microstructure; and
   a fuel tank secured between the pair of side rails so that the fuel tank is located within a rectilinear frame formed by the pair of side rails and the cross members,
   wherein the first longitudinal member and the second longitudinal member span between the first cross member and the second cross member to further form a fuel tank protection assembly, and wherein each of the soft strength zones extends outboard of the fuel tank.

2. The assembly of claim 1 further comprising a seat frame assembly secured to one of the first cross member at the first central hard strength zone or the second cross member at the second central hard strength zone so that each of the soft strength zones of the first cross member and the second cross member extends outboard of the seat frame assembly.

3. The assembly of claim 1, wherein a length of each of the two first soft strength zones is between thirty percent and thirty-three percent of a length of the first cross member and a length of each of the two second soft strength zones is between thirty and thirty-two percent of a length of the second cross member.

4. The assembly of claim 1, wherein the second cross member further includes a U-shaped portion at the second central hard strength zone sized to accommodate a portion of a drive axle.

5. The assembly of claim 1, wherein the hard strength zones of the first cross member and the second cross member are thermally treated at a temperature at or above 900 degrees Celsius.

6. The assembly of claim 1, wherein the central hard strength zones of the first cross member and the second cross member are thermally treated to form a fully martensitic microstructure.

7. The assembly of claim 1, wherein the central hard strength zones of the first cross member and the second cross member have a tensile strength of between 1000 MPa and 1900 MPa.

8. The assembly of claim 1 wherein a length of each of the two first soft strength zones is approximately 440 millimeters and a length of each of the two second soft strength zones is approximately 340 millimeters.

9. A vehicle component protection assembly comprising:
first and second cross members for extending between side rails and each including two ends on either side of a central region, wherein the two ends each have a tensile strength less than a tensile strength of the central regions so that each of the ends deforms between zero and three-hundred forty millimeters to absorb energy from a side impact prior to the energy reaching the central regions; and
a pair of longitudinal members secured between the first and second cross members,
wherein the first and second cross members, the side rails, and the pair of longitudinal members are arranged with one another to form a rectilinear frame to prevent or minimize impact to a fuel tank or traction battery mounted to one of the first and second cross members or one of the pair of longitudinal members, and the central regions and the pair of longitudinal members are heated at or above 900 degrees Celsius to form fully martensitic microstructures.

10. The assembly of claim 9, wherein the first and second cross members are arranged with one another so that deformation of each of the ends as a result of an impact of 5,000 to 15,000 lbf is such that the side rails do not contact a fuel tank mounted to the first and second cross members.

11. The assembly of claim 9, wherein the central regions and the pair of longitudinal members are cooled at a cooling rate of 100 degrees Celsius per second to form fully martensitic microstructures.

12. The assembly of claim 9, wherein each of the central regions have a tensile strength of 1000 to 1900 MPa and each of the two ends have a tensile strength of 400 to 600 MPa.

13. The assembly of claim 9 further comprising a seat frame assembly mounted to a hard strength zone of one of the cross members or the longitudinal members so that each of the two ends of the first cross member and the second cross member extends outboard of the seat assembly.

14. The assembly of claim 9 further comprising a seat frame assembly mounted to a hard strength zone of one of the cross members of the longitudinal members so that deformation of each of the two ends as a result of an impact of 5,000 to 15,000 lbf is such that the side rails do not contact the seat assembly.

15. A vehicle component protection assembly comprising:
first and second cross members for extending between side rails and each including two ends on either side of a central region, wherein the two ends each have a tensile strength less than a tensile strength of the central regions so that each of the ends deforms between zero and three-hundred forty millimeters to absorb energy from a side impact prior to the energy reaching the central regions; and
a pair of longitudinal members secured between the first and second cross members,
wherein the first and second cross members, the side rails, and the pair of longitudinal members are arranged with one another to form a rectilinear frame to prevent or minimize impact to a fuel tank or traction battery mounted to one of the first and second cross members or one of the pair of longitudinal members, and wherein the central regions and the pair of longitudinal members are cooled at a cooling rate of 100 degrees Celsius per second to form fully martensitic microstructures.

* * * * *